April 18, 1950          L. J. WONG          2,504,170
GYROSCOPE PRECESSING MECHANISM
Filed Sept. 30, 1944
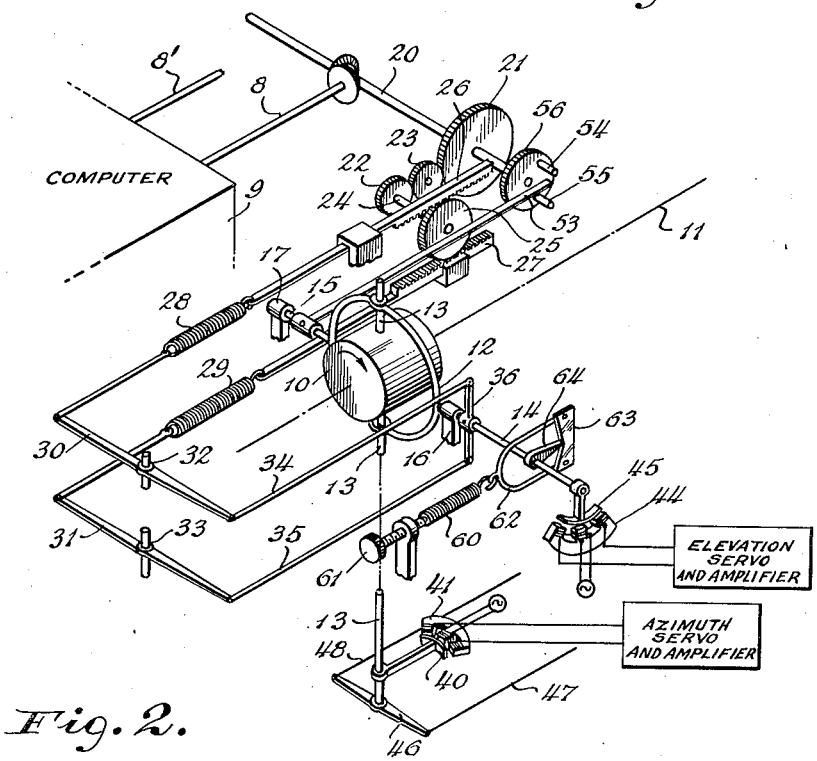
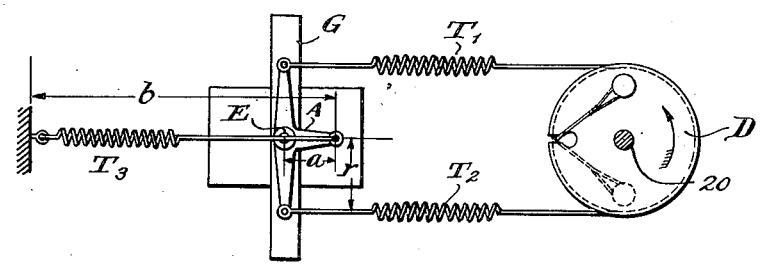
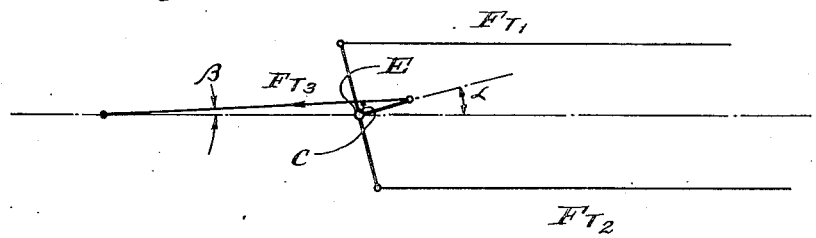
INVENTOR
LAN J. WONG
BY Herbert H. Thompson
his ATTORNEY.

Patented Apr. 18, 1950

2,504,170

UNITED STATES PATENT OFFICE 2,504,170

GYROSCOPE PRECESSING MECHANISM

Lan J. Wong, Hoboken, N. J., assignor to The Sperry Corporation, a corporation of Delaware Application September 30, 1944, Serial No. 556,612

10 Claims. (Cl. 74—5.4)

This invention relates to spring-precessed gyroscopes and has for its object the provision of a highly accurate spring mechanism for controlling the precession of a gyroscope.

Another object of the invention is the provision of a gyroscope precessing mechanism by which a gyroscope may be precessed at different rate gradients.

A further object of the invention is to provide a novel arrangement for compensating the precessing mechanism for small errors occasioned by slight lag in an associated follow-up system.

Other objects will appear in the following description given with the aid of the accompanying drawings, of which:

Fig. 1 is a schematic drawing of a gyroscope having a precessing mechanism according to a preferred embodiment of the present invention;

Fig. 2 is a schematic drawing of a toggle spring arrangement applied to the gimbal ring of a gyroscope; and Fig. 3 is a vector diagram illustrating the operation of the toggle spring of Fig. 2.

For the sake of clarity, only the mechanism for precessing the gyroscope about its azimuth axis is shown in detail in the drawings. It will be understood that a similar mechanism is to be used to control precession of the gyroscope about the elevation axis.

Referring to Fig. 1 of the drawings, the gyroscope 10 is mounted in gimbal ring 12 for precession about azimuth and elevation axes, the dot dash line 11 indicating the spin axis. Aligned shafts 13 having bearings in the gimbal ring support the gyroscope for rotation about the azimuth axis. The gimbal ring is supported for rotation about the elevation axis by shafts 14 and 15 attached to opposite sides thereof which turn in bearings 16 and 17 in a supporting structure to be stabilized, which may be a part of a sight casing.

Gyroscope 10 will be considered by way of example in describing the present invention to be a controlled rate gyroscope such as is used in certain gun sights, in which movement of control means such as hand grips, not shown, by the gunner causes precessional torques to be applied to the azimuth and elevation axes of a gyroscope of the sight, thus precessing the gyroscope and establishing tracking rates which are proportional to the azimuth and elevation displacement of the hand grips. The displacement of the hand grips required to cause the sight to track a target is, therefore, proportional to target speed and suitable mechanical means connected therewith are used to provide a displacement proportional to rate for the computing mechanism of a sight.

In the drawings, an input or rate shaft 20 is shown which will be understood to be displaced by some control means, such as hand grips for the purpose of applying torques to the gyroscope to cause the spin axis thereof to turn in azimuth to track a target. Shaft 20 is geared to shaft 8 which operates a computing mechanism indicated by oblong 9 in proportion to the displacement of shaft 20. A similar arrangement, not shown, which controls shaft 8' of the computing mechanism, is operated in like manner to impart an elevational precession movement to the gyroscope about the axis defined by shafts 14 and 15.

Gear 21 on shaft 20 drives gear 22 through idler gear 23. Gear 22 is mounted on a shaft 24 carrying gear 25 which meshes with racks 26 and 27 supported for reciprocation in suitable guides. The racks are attached to and are preferably aligned with springs 28 and 29 coupled respectively under tension to ends of levers 30 and 31 having fulcrums 32 and 33 respectively. The free ends of the levers are connected by tension members 34 and 35 to opposite ends of arm 36 secured at its midpoint to shaft 14 of the elevation axis. Tension springs 28 and 29 are preferably matched to the gyroscope so that the displacement of shaft 20 forms an accurate measure of rate.

In operation, movement of shaft 20 and gear 25 in either direction displaces the racks and changes the tension of springs 28 and 29 which exert a corresponding precessional torque about the elevation axis, that causes the gyroscope to precess about its azimuth axis at a rate proportional to the torque exerted.

In former gyroscope precessing devices sheave arrangements such as the sheave shown in Fig. 2 were used for differentially tensioning the precessing springs of a gyroscope. It has been found that the winding of the rather stiff music wire about the pulleys caused some small inaccuracies in the tension applied to the springs for given displacements of the input shaft and hence the input shaft displacement was not always a completely accurate measure of precession rate. This disadvantage is overcome by the rack and pinion arrangement of Fig. 1 in which a straight pull is applied differentially to the springs 28 or 29 over the entire torque range.

A gyroscope arrangement of the type described is usually employed to stabilize some device such as a gun, a turret, a sighting device, or the like, For this purpose, a known pick-off arrangement may be employed consisting of armatures attached to the azimuth and elevation axes having cooperating pick-off coils coupled with the object to be stabilized which, in the present instance, is the support for the gyroscope. When relative displacement of the armature and pick-off coils occurs servo mechanism, is actuated by the pick-off coil circuits in such direction as to move the gyroscope support with respect to the gyroscope until no displacement exists between the pick-off coils and their armatures. The servo mechanism may be of any suitable kind and is merely indicated diagrammatically in the drawings. An example of such a follow-up system is shown in Fig. 2 of the patent to Knowles et al. No. 2,414,108, dated January 14, 1947, for Stabilized gun control and tracking system.

When the shaft 20 is rotated in either direction, one or the other of racks 26 or 27 will be displaced toward the right of the drawing by gear 25 while the other rack will be moved in the opposite direction and the springs will be tensioned accordingly. A torque will be exerted by the spring having the greater tension through the associated lever 30 or 31 and tension wires 34 and 35 on arm 36 which will cause the gyroscope to precess in the appropriate direction about the azimuth axis as defined by shaft 13.

A suitable pick-off device such as armature 40 is attached to shaft 13 and moves therewith. The armature cooperates with a pick-off coil arrangement 41, usually of the E type, so fixed to the object to be stabilized that when the latter is aligned with the gyroscope, the armature is symmetrically positioned with respect to the respective poles of the pick-off coil. When precessional movement of the gyroscope about the azimuth axis tends to displace armature 40 with respect to the pick-off coil 41, a signal is produced in the coil which is effective to cause the servo mechanism to displace the support for the coil so that the latter is maintained in register with the armature.

A similar pick-off arrangement is provided for the elevation axis consisting of an armature 45 secured to the gimbal ring for rotation in elevation, the armature being shown in the drawings as attached to shaft 14. The armature cooperates with a pick-off coil device 44 which controls a servo mechanism shown diagrammatically which is effective when relative displacement of the coil and armature exists to so displace the coil and its support as to maintain the armature and coil closely in register.

Torque is applied to arm 46 secured to shaft 13 by tension wires 47 or 48 to cause the gyroscope to precess about the elevation axis. The elevation precessing arrangement is not fully shown as it is identical with that already described for the azimuth axis and operates in the same manner.

When the gyroscope mechanism is to be used for tracking purposes, it is desirable that a precession rate gradient considerably higher than that provided by spring 28 and 29 be available to permit slewing of the gun or the like for the purpose of overtaking a target. The present invention provides a slewing spring arrangement for this purpose which, at the will of the operator, is instantly available whenever slewing movement is desirable.

In Fig. 1, a cantilever or leaf spring 53 fixed at one end to the elevation axis of the gyroscope projects between spaced studs 54 and 55 on a wheel 56 secured to shaft 20. The spring and studs are so disposed that when shaft 20 has turned a predetermined distance in either direction, one stud or the other will engage the relatively stiff spring 53 and further movement of shaft 20 will cause the stud to bow or tension the spring proportionately, thereby imparting an increased torque to the gyroscope with a corresponding increase in the precession rate thereof. The studs are so disposed on wheel 56 that they are ineffective for some predetermined range of movement of shaft 20, for example, about ninety percent of the movement of the shaft in either direction. It will be noted that the transition from tracking range of precessional rate to the increased or slewing range of precessional rate is gradual and smooth.

From the foregoing, it will be understood that the precession mechanism provides a small rate gradient over the major portion of the motion of input shaft 20 which increases to a much greater value when the slewing spring becomes effective and thereafter provides a much larger gradient for slewing.

Theoretically, rolling and pitching of the vehicle on which the device is mounted, or in other words, tilt of the outer casing (not shown), will not cause springs 28 or 29 to exert a torque upon the gyroscope because the follow-up system mentioned above will stabilize the casing about both the axes 13, 14. Actually, however, there is a small error lag, usually less than one degree which may cause the gimbal 12 to tilt about axis 14. If this tilt occurs, the tensions in springs 28 or 29 will vary and consequently a different torque will be produced for any given position of shaft 20. Since the angular position of this shaft is used as a measure of gyroscope precession rate, the change in gyroscope gimbal torque will result in a different rate than that for which the shaft was calibrated and an error results. To overcome this difficulty, applicant has provided a novel toggle or decentralizing spring attached to the gimbal axis.

The decentralizing spring arrangement shown in Fig. 1 comprises a spring 60 having one end attached to an adjusting screw 61 and the other end fastened to a yoke 62 between whose arms a notched fulcrum plate 63 is secured, the notch resting on a knife edge fulcrum 64 attached to shaft 14 of the gimbal ring. The parts just mentioned are so disposed that when the gimbal is properly positioned, the spring, fulcrum and gimbal shaft are in alignment and no torque is exerted by spring 60 on the axis of the gyroscope. If the gimbal ring becomes slightly displaced about its axis, the fulcrum and spring are no longer in alignment and a compensating torque is exerted by the spring 60 on the shaft 14 in the same direction as the gimbal ring is displaced and this torque will be such as to require the input shaft 20 to be correctly positioned for a given precession rate, notwithstanding the displacement of the gimbal ring.

The operation of the decentralizing spring will be described with reference to Figs. 2 and 3, where springs $T_1$ and $T_2$, similar to springs 28 and 29, attached to disc D on a shaft 20 are used to apply torques to gimbal ring G disposed for rotation about an axis E. A decentralizing spring $T_3$ is connected between a support and an arm A extending from the gimbal. The distance between the points between which spring $T_3$ is supported is indicated by $b$, and the distance between axis E and the point on arm A where spring $T_3$ is attached is represented by $a$. The parts are so arranged that when the gimbal is in normal position, the arm, axis E and the spring are in alignment and no torque is exerted by the spring on the gimbal ring.

Referring to Fig. 3, if servo error results in the gimbal moving by an angle $\alpha$, springs $T_1$ and $T_2$ will change in length by $r\alpha$ where $r$ represents the distance from the gimbal pivot center E to the attachment of either $T_1$ or $T_2$, and the $T_3$ spring line will make an angle $\beta$ with the center line. $F_{T_1}$ will increase, $F_{T_2}$ will decrease by an amount $\Delta F = kr\alpha$ where $k = $ the spring constant for $T_1$ and $T_2$. The new torque on the gimbal will be $$T + \Delta T = (F_{T_1} + \Delta F)r - (F_{T_2} - \Delta F)r$$

using the convention that torque is plus when in a clockwise direction.

$$T + \Delta T = (F_{T_1} - F_{T_2})r + 2\Delta F r$$

but $$T = (F_{T_1} - F_{T_2})r$$

initially, so $$\Delta T = 2r\Delta F = 2kr^2\alpha$$

is the error in torque.

Considering the effect of spring $T_3$, when the gimbal is in its proper position, the spring tension pulls through the center of the gimbal pivot and contributes no torque. However, if the gimbal tilts, the spring $T_3$ will act off center and produce a torque $T_{T_3}$. The relationship is as follows:

$$\frac{\alpha}{\beta} = \frac{b}{a}$$

so $$\beta = \frac{a}{b}\alpha$$

$$T_{T_3} = -F_{T_3} C$$

but $$C = (b-a)\beta = -F_{T_3}(b-a)\beta = -F_{T_3}\frac{(b-a)a\alpha}{b}$$

where $\beta$ is the angle by which $T_3$ is offset from the center line, and $C$ is the normal distance from the centerline of $T_3$ to the axis E.

If we properly proportion $a$, $b$ and $F_{T_3}$ we can make $T_{T_3} + \Delta T = 0$ or $$F_{T_3}\frac{(b-a)}{b}a\alpha = 2kr^2\alpha$$

and $$F_{T_3} = \frac{2kr^2 b}{a(a-b)}$$

Therefore, when toggle spring $T_3$ has the above tension in it, there will be no errors in gyro torque due to gimbal tilt when the follow-up system is not perfect.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a control device for a gyroscope, a displaceable control member, spring means controlled thereby for applying precessing torques about an axis of the gyroscope in proportion to the displacement of the member, and other spring means actuated by the member beyond a predetermined displacement thereof for applying greater precessional torques to the gyroscope.

2. In a control device for a gyroscope, a displaceable control member, spring means adjusted thereby for applying precessing torques about an axis of the gyroscope, and other spring means actuated by the member at a predetermined displacement thereof for applying additional precessional torques to the gyroscope axis.

3. In a control device for a gyroscope, a displaceable control member, spring means adjusted thereby for applying precessing torques to an axis of the gyroscope in proportion to the extent of adjustment and other spring means made effective on a predetermined further displacement of the control member for applying additional precessing torques to the axis of the gyroscope.

4. In a control mechanism for a gyroscope, a rotary shaft, spring means tensioned by the shaft in proportion to the displacement thereof for applying precessing torques to an axis of the gyroscope, a pair of spaced members carried by the shaft, a cantilever spring attached to said axis of the gyroscope disposed between said members in the rotary path thereof, but normally out of engagement therewith, the arrangement being such that a predetermined angular displacement of the shaft in one direction or the other will cause an appropriate one of the members to engage the cantilever spring and further rotation of the shaft will cause the member to flex the spring thereby imparting additional torque to the axis of the gyroscope.

5. In a control mechanism for a gyroscope, rotary control shaft means, spring means adjustably tensioned by the shaft means in proportion to the displacement thereof for applying precessing torques to the gyroscope at a desired rate, cantilever spring means attached to at least one of the respective gyroscope axes, means displaceable with the shaft means and effective only at predetermined displacements thereof to engage the cantilever spring means and impart therethrough additional torques around said axis of the gyroscope to precess the same at an increased rate for slewing purposes.

6. In a mechanism including a gyroscope and calibrated spring connected precessing means therefor, means for compensating the spring precessing means upon tilting of the gyroscope about its axis of precession comprising a decentralizing spring effective when the tilt exists to exert such torque on said axis as to compensate the spring precessing means for the existing tilt.

7. In a mechanism including a gyroscope and spring precessing means therefor calibrated according to precession rates, means for compensating the spring precessing means upon tilting of the gyroscope about an axis of precession comprising a decentralizing spring effective only when tilt exists to exert such torque about said axis that the tensioning of the spring precessing means required for a given precession rate will be unaffected by such tilt.

8. In a gyroscope having a centralizing spring arrangement adapted to exert controlling torques thereon, means for exerting a decentralizing torque on said gyroscope only when tilt exists to cancel the resultant torque otherwise exerted by said centralizing spring arrangement, comprising a spring, a pivot point for one end thereof coupled to the axis but offset to one side thereof, securing means for the other end of the spring disposed on the opposite side of the axis, the arrangement being such that when no tilt of the axis exists, the pivot, gyroscope axis, and securing means are in alignment.

9. In a mechanism including a gyroscope and its support and calibrated precessing means therefor, means for compensating the precessing means for tilting of the support about its axes comprising spring means for each axis effective only when tilt exists to exert a torque about the axis of tilt whereby the displacement of the precessing means for a given precession rate is unaffected by such tilt.

10. A decentralizing spring arrangement for exerting a torque on a gimbal ring of a gyroscope effective only in response to tilting of the gimbal ring about its axis comprising a fulcrum member carried by the gimbal ring offset to one side of the axis thereof, a tilting plate disposed on the fulcrum, a yoke having arms respectively connected to points on the plate on opposite sides of the fulcrum, a spring having one end attached to the yoke, securing means for the opposite end of the spring disposed externally of the gimbal ring and at the side of the axis opposite to that at which the fulcrum is located, the spring being tensioned between the securing means and the yoke, the securing means, axis and fulcrum being in alignment when the gimbal ring is not tilted.

LAN J. WONG.

REFERENCES CITED

The following references are of record in the file of this patent:

UNITED STATES PATENTS

| Number | Name | Date |
| --- | --- | --- |
| 1,031,769 | Barr et al. | July 9, 1912 |
| 1,902,802 | Hobbs | Mar. 21, 1933 |

FOREIGN PATENTS

| Number | Country | Date |
| --- | --- | --- |
| 21,843 | Great Britain | Oct. 15, 1908 |
| 346,648 | Italy | Feb. 27, 1937 |
| 421,917 | Great Britain | Jan. 2, 1935 |
| 495,424 | Great Britain | Nov. 14, 1938 |